United States Patent
Yoakum et al.

(10) Patent No.: US 7,333,505 B2
(45) Date of Patent: Feb. 19, 2008

(54) TRANSACTION MANAGEMENT FOR INTERWORKING BETWEEN DISPARATE NETWORKS

(75) Inventors: John H. Yoakum, Cary, NC (US); Barbara A. Ward, Wildwood, MO (US); Paula Marie Holwell, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 850 days.

(21) Appl. No.: 09/741,401

(22) Filed: Dec. 18, 2000

(65) Prior Publication Data

US 2002/0075881 A1 Jun. 20, 2002

(51) Int. Cl.
*H04J 3/22* (2006.01)
(52) U.S. Cl. .................... 370/466; 370/353; 370/465
(58) Field of Classification Search ............. 370/352, 370/353, 354, 355, 356, 395.2, 465, 466, 370/467
See application file for complete search history.

(56) References Cited

U.S. PATENT DOCUMENTS

| | | | | | |
|---|---|---|---|---|---|
| 5,218,602 | A | * | 6/1993 | Grant et al. ............... | 370/390 |
| 5,761,424 | A | * | 6/1998 | Adams et al. ............. | 709/217 |
| 5,825,780 | A | * | 10/1998 | Christie .................... | 370/522 |
| 5,845,081 | A | * | 12/1998 | Rangarajan et al. ...... | 709/224 |
| 5,909,686 | A | * | 6/1999 | Muller et al. ............ | 707/104.1 |
| 5,924,095 | A | * | 7/1999 | White ....................... | 707/10 |
| 6,058,429 | A | * | 5/2000 | Ames et al. ............... | 709/242 |
| 6,147,994 | A | * | 11/2000 | Duree et al. ............... | 370/392 |
| 6,154,775 | A | * | 11/2000 | Coss et al. ................. | 709/225 |
| 6,351,470 | B1 | * | 2/2002 | Rasanen .................... | 370/465 |
| 6,483,820 | B1 | * | 11/2002 | Davidson et al. ......... | 370/329 |
| 6,515,972 | B1 | * | 2/2003 | Gage et al. ................ | 370/328 |
| 6,597,686 | B1 | * | 7/2003 | Smyk ........................ | 370/352 |
| 6,674,733 | B1 | * | 1/2004 | Huusko ..................... | 370/329 |
| 6,735,621 | B1 | * | 5/2004 | Yoakum et al. ........... | 709/218 |

(Continued)

FOREIGN PATENT DOCUMENTS

WO    WO 9848542 A1  * 10/1998

(Continued)

OTHER PUBLICATIONS

Schulzrinne, H. et al. "The Session Initiation Protocol: Internet-Centric Signaling," IEEE Communications Magazine. Oct. 2000. vol. 38, iss. 10, pp. 134-141.*

(Continued)

*Primary Examiner*—Chi Pham
*Assistant Examiner*—Donald L Mills
(74) *Attorney, Agent, or Firm*—Withrow & Terranova, PLLC (57) ABSTRACT

The present invention enables a data-driven, dynamic transaction manager capable of coordinating interworking between disparate networks. The transaction manager is preferably provided in a gateway connecting the disparate networks. The transaction manager may dynamically determine which tasks, messages, and interactions must be involved in the fulfillment of a transaction based on a variety of data-driven sources. The transaction manager is flexible and configurable rather than a rigid architecture requiring an application-specific configuration. With the present invention, the data driving the transaction manager may involve parameters from the incoming inquiry message, parameters in data from various sources associated with the contents of the incoming message, and parameters in the gateway's behavioral configuration data, as well as parameters received in response from activities involved directly in the transaction.

15 Claims, 7 Drawing Sheets

U.S. PATENT DOCUMENTS

| | | | |
|---|---|---|---|
| 6,876,653 B2 * | 4/2005 | Ambe et al. | 370/389 |
| 2001/0040885 A1 * | 11/2001 | Jonas et al. | 370/352 |
| 2001/0055299 A1 * | 12/2001 | Kelly | 370/352 |

FOREIGN PATENT DOCUMENTS

| WO | WO 3003767 A1 * | 1/2003 |
|---|---|---|

OTHER PUBLICATIONS

Hong, L. et al. "Voice Over IP Signaling: H.323 and Beyond," IEEE Communication Magazine. Oct. 2000. vol. 38, iss. 10, pp. 142-148.*

Ambe et al., "High Performance Self Balancing Low Cost Network Switchign Architecture Based on Distributed Hierarchical Shared Memory," Jul. 8, 1998, Provisional Application for Patent, 1-52.*

* cited by examiner

| ACTIVITY DEFINITION TABLE | |
|---|---|
| ACTIVITY ID | A2 |
| ACTIVITY TYPE (INT./EXT.) | EXTERNAL |
| INVOCATION MESSAGE | SIP INVITE |
| RESPONSE MESSAGE | SIP MOVED |
| SUCCESS RESPONSE | CONNECT |
| FAILURE RESPONSE | RELEASE |
| FALL BACK RESPONSE | CONNECT |
| SERVER | 1 |
| SERVER | 2 |
| SERVER | 3 |
| SERVER | 4 |

*FIG. 6*

| ACTIVITY KEY TABLE | |
|---|---|
| ACTIVITY KEY | ACTIVITY LIST ID |
| AK 01 | AL 12 |
| AK 02 | AL 15 |

*FIG. 4*

| ACTIVITY LIST TABLE | |
|---|---|
| ACTIVITY LIST ID | ACTIVITY ID |
| AL 00 | A1; A3 |
| AL 12 | A2; A3; A4 |
| AL 15 | A6 |

*FIG. 5*

| EXEMPLARY TRANSACTION RECORD PROGRESSION |||| 
|---|---|---|---|
| LOOP | ORIGINAL PARAMETER | LATEST PARAMETER | ACTIVITY LIST |
| 1 | A, B | A  B | A2; A3; A4 |
| 2 | A, B | A  M | A3; A4; A16 |
| 3 | A, B | A  M | A4; A16 |
| 4 | A, B | A  M | A16 |

TRANSACTION MANAGEMENT FOR INTERWORKING BETWEEN DISPARATE NETWORKS

FIELD OF THE INVENTION

The present invention relates to facilitating communications between disparate networks, and in particular, to providing a configurable transaction manager to facilitate communications between the networks.

BACKGROUND OF THE INVENTION

Inherent in many communication protocols is the concept that when a message is sent to a device, the sender is expected to provide a response within a reasonable period of time. The device receiving the message will traditionally decode the message and generate a reply, associating the reply with the incoming message to enable the sender to associate the reply with the original message.

When interfacing with networks of differing technologies, devices in one network inherently cannot communicate or understand the behavior of devices in the other network. Interworking between such disparate networks may be facilitated using a gateway between the networks. The gateway is typically configured to facilitate communications between networks, but typically does not process the information being communicated. The gateway is normally configured to provide a transaction manager for each supported protocol. The transaction manager is generally dedicated to specific networking applications, and thus, normally provides a very rigid response for predetermined inputs. Given the accelerated evolution of the number of services and types of messages that a gateway must handle, rigid, application-specific transaction managers slow development and increase the cost of networks by requiring application-specific configuration.

Thus, there is a need for a general-purpose transaction manager that is adaptive to the needs of the respective networks and the interworking therebetween. Further, there is a need for a transaction manager capable of dynamically reacting to the data associated with the signaling and not merely the type of signaling between the networks. The transaction manager should be responsive to a variety of parameters associated with the data wherein the parameters may be derived from an incoming message, the gateway, either of the networks, or a combination thereof.

SUMMARY OF THE INVENTION

The present invention enables a data-driven, dynamic transaction manager capable of coordinating interworking between disparate networks. The transaction manager is preferably provided in a gateway connecting the disparate networks. The transaction manager may dynamically determine which tasks, messages, and interactions must be involved in the fulfillment of a transaction based on a variety of data-driven sources. The transaction manager is flexible and configurable rather than a rigid architecture requiring an application-specific configuration. With the present invention, the data driving the transaction manager may involve parameters from the incoming inquiry message, parameters in data from various sources associated with the contents of the incoming message, and parameters in the gateway's behavioral configuration data, as well as parameters received in response from activities involved directly in the transaction.

The dynamic behavior of the transaction manager allows individual instances of inbound messages in one protocol encoded in a single format to initiate a variety of activities in the network being interfaced without any direct knowledge of what is required in that network. The present invention also allows the selection of activities to be dependent on data arising from an inquiry in the second network, rather than on logic hard coded in the gateway. Additionally, the behavior of the gateway implementing the transaction manager is easily customized to support different interworking applications by simply supplying behavioral configuration data to select a set of desired activities and messages, rather than building dedicated gateways or gateway applications for specific interworking tasks.

Generally, the transaction manager will receive an initial message requiring a response via a first network and build a transaction record including executable activities used to determine the response. The transaction manager will facilitate execution of the activities in the transaction record. The activities may be internally executed or sent to a network device in a second network for execution. Based on the data associated with the execution of the activities, the transaction manager will dynamically modify the transaction record while the transaction is processed. The transaction record is modified by changing the activities or parameters forming the transaction record. Once the transaction is processed by executing the activities in the transaction record, the transaction manager will generate and send a response to the original message via the first network.

Those skilled in the art will appreciate the scope of the present invention and realize additional aspects thereof after reading the following detailed description of the preferred embodiments of the invention in association with the accompanying drawing figures.

BRIEF DESCRIPTION OF THE DRAWING FIGURES

The accompanying drawing figures incorporated in and forming a part of the specification illustrate several aspects of the invention, and together with the description serve to explain the principles of the invention.

DETAILED DESCRIPTION OF THE PREFERRED EMBODIMENTS

The present invention provides for an adaptive transaction manager for a gateway connecting disparate networks. The transaction manager is adapted to avoid proprietary configuration for application-specific occurrences. The transaction manager is uniquely configured to operate on a variety of parameters associated with a variety of sources, including incoming signaling messages, sources associated with the contents of an incoming message, and behavioral configuration data in the gateway, as well as responses from activities involved directly in a transaction. The dynamic behavior of the transaction manager allows individual instances of inbound messages in one protocol, encoded in a single format, to initiate a variety of activities in another network without any direct knowledge of what is actually required in that network. Upon reading the following description in light of the accompanying drawing figures, those skilled in the art will understand the concepts of the invention and will recognize applications of these concepts not particularly addressed herein. It should be understood that these concepts and applications fall within the scope of this disclosure and the accompanying claims.

The embodiments set forth below represent the necessary information to enable those skilled in the art to practice the invention and illustrate the best mode of practicing the invention. Although the present invention is applicable to many types of disparate networks, a specific combination of networks and a particular functionality is described in order to disclose the best mode of carrying out the invention and to provide an enabling disclosure.

Figure 1A:
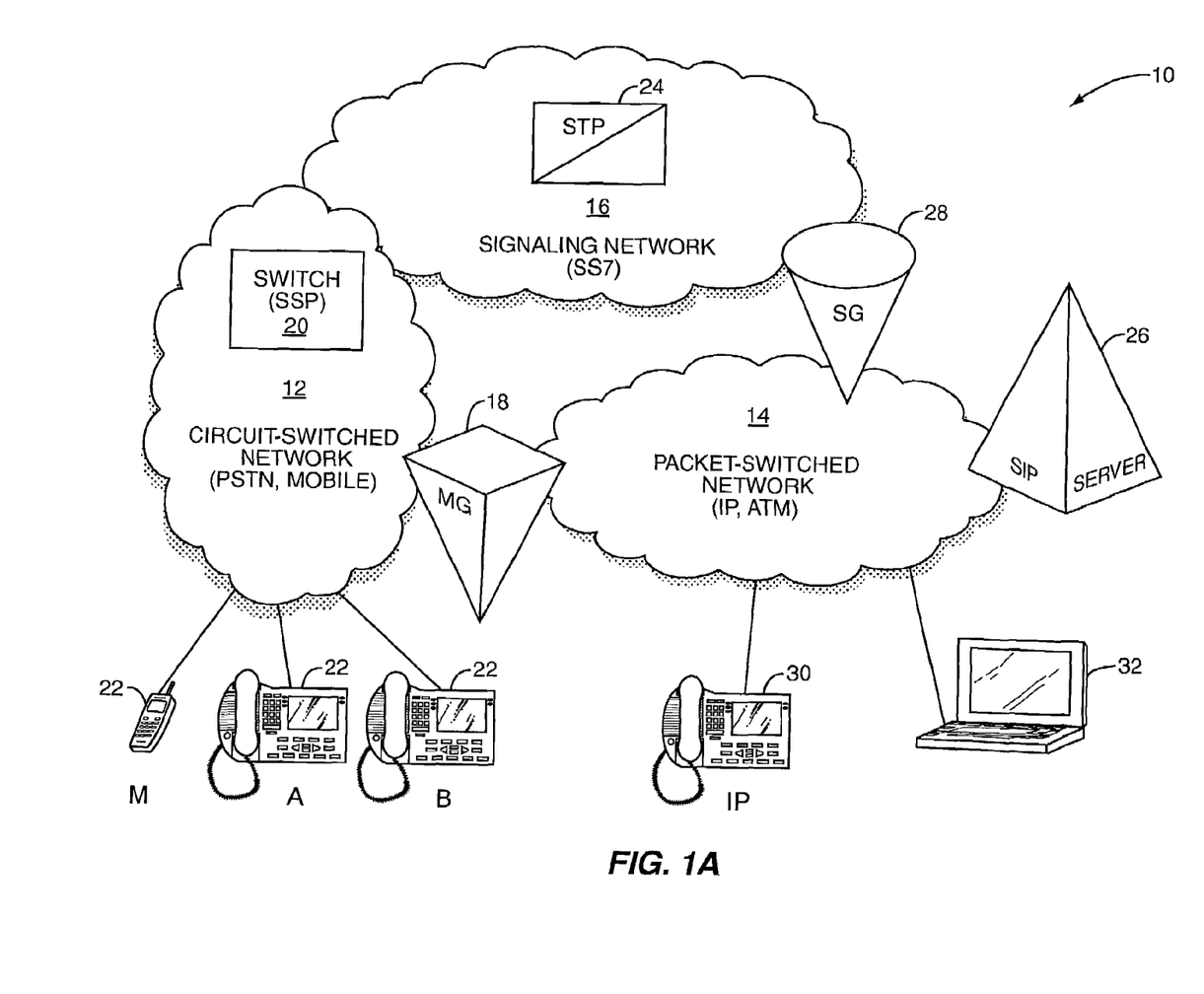
FIG. 1A illustrates an exemplary networking environment according to the present invention.

With reference to FIG. 1A, a network environment 10 is illustrated according to a preferred embodiment of the present invention. The network environment 10 is depicted as including a circuit-switched network 12 interworking with a packet-switched network 14. The circuit-switched network 12 may include the public switched telephone network (PSTN) or a wireless communication network facilitating like communications. The packet-switched network 14 may include any type of packet-based network, but preferably is an Internet Protocol (IP), Asynchronous Transfer Mode (ATM) network, or combination thereof.

Circuit-switched communications typically require call processing provided over a signaling network 16, such as a Signaling System number 7 (SS7) network. In SS7, a layer of the protocol called the Transaction Capabilities Application Part (TCAP) handles queries and responses for databases. The SS7 standards are well known. For further information see Telcordia Technologies, GR-246-CORE, *Specification of Signaling System Number 7*, December, 1999, which is incorporated herein by reference. The capabilities of SS7 have been extended by another layer, called Intelligent Network Application Protocol (INAP). A network that features this protocol is called an Intelligent Network (IN). INAP is described in European Telecommunication Standards Institute (ETSI) Publication, ETSI-CORE-INAP-CS2, *Intelligent Network Application Protocol, Capability Set* 2, March, 1996, which is incorporated herein by reference.

The signaling network 16 will typically provide sufficient call processing to establish and teardown circuits required for calls, as well as provide numerous call features during a call. Communications between the circuit-switched network 12 and the packet-switched network 14 are facilitated by a media gateway (MG) 18, which is capable of converting circuit-switched traffic to packet-switched traffic and vice versa to facilitate media flows spanning both networks.

Typically, the circuit-switched network 12 will include a number of switches 20 that cooperate with any number of telephony devices 22 to provide circuit-switched connections. As depicted, the telephony devices 22 may include any type of device, including wireless telephones and traditional wire-line telephones. Generally, the switch 20 forms a signal switching point (SSP) that cooperates with a signal transfer point (STP) 24 and a signal control point (SCP, not shown) in an SS7 implementation of the signaling network 16 to form an intelligent network. When providing call processing, the switch 20 will cooperate with the STP 24 and SCP to allocate circuits and provide a number of call features.

As networks evolve, call processing and the number of call features made available to subscribers increase. Certain of these features, such as local number portability, caller ID, automated callback, call forwarding, prepaid calling services and other calling features, may require a signaling network 16 to cooperate with devices on other networks to provide the call feature, access information relating to the call, or establish telephony communications. For example, telephony communications between circuit-switched and packet-switched devices may require call setup and reservation of resources on the packet-switched network 14.

Typically, packet-switched devices, such as the server 26, may provide additional call processing for circuit-switched communications via a signaling gateway (SG) 28. The signaling gateway 28 must facilitate the interworking of the signaling network 16 and the packet-switched network 14 to enable devices like the switch 20 to communicate with the server 26. Further, the server 26 may support the operation of packet-switched telephony devices, such as the packet-switched telephone (e.g. IP phone) 30 and the personal computer 32 in a traditional client-server configuration. Thus, call processing for either the circuit-switched or packet-switched networks 12, 14 may require the switch 20 to communicate with the server 26 through the STP 24 and the signaling gateway 28.

The present invention is particularly useful for gateways, such as the signaling gateway 28, wherein the signaling network 16 and the packet-switched network 14 use different protocols and networking technologies, and devices on both of the networks must be able to efficiently communicate with one another. With this particular example for call processing the present invention departs from the rigid, application-specific architecture of current signaling gateways and provides a dynamic architecture for the signaling gateway 28 to facilitate dynamic configuration and reaction to evolving network demands.

Figure 1B:
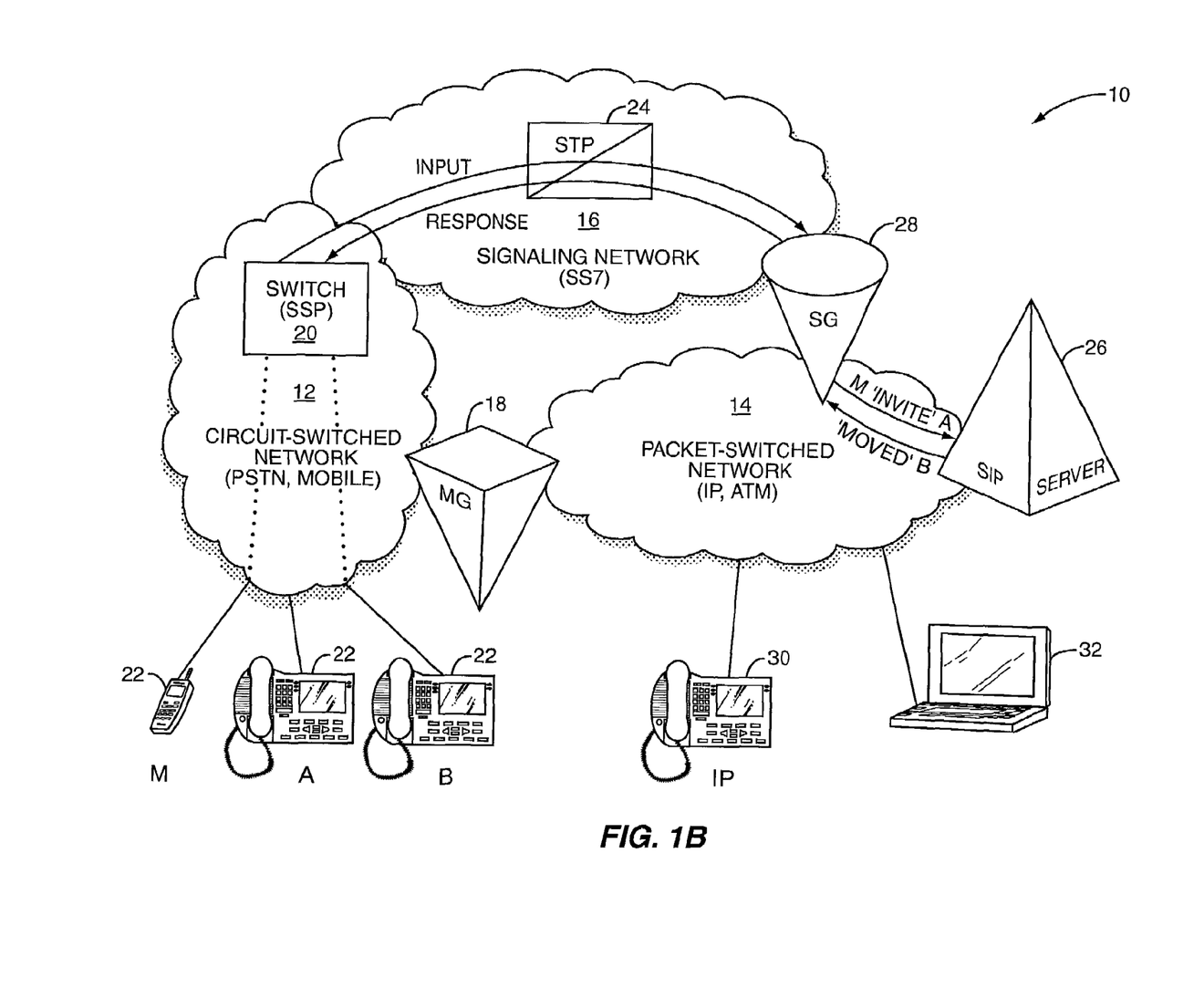
FIG. 1B illustrates exemplary call signaling in the network environment of FIG. 1A according to the present invention.

To facilitate a better understanding of the basic function of the signaling gateway 28, an exemplary call signaling sequence is depicted in FIG. 1B. In this example, assume that the signaling network 16 implements the traditional SS7 protocol and the call processing requires interaction with the server 26, which communicates with the signaling gateway 28 using the Session Initiation Protocol (SIP). Reliable, flexible, multimedia and voice traffic over IP networks has been enabled by SIP as described in Internet Engineering Task Force (IETF) Request for Comments (RFC) 2543: *Session Initiation Protocol*, March 1999, which is incorporated herein by reference. SIP is an application layer control protocol that is used to establish, modify, and terminate multimedia sessions or calls. SIP provides proxiable messages used to perform call setup, modification, and termination functions. For example, one SIP message used to perform call setup functions is the INVITE message. The INVITE message is conventionally used to invite telephony devices to participate in a media stream communication, such as a voice communication, a data communication, a video communication, or any combination thereof. The INVITE message includes a session description protocol (SDP) portion that is used by end user devices to exchange media capabilities and other information.

Assuming initially that the operator of telephony device 22M desires to call a party believed to be at telephony device 22A. Unbeknownst to the operator of telephony device 22M, the party being called uses a local number portability feature, which currently associates the number formerly associated with telephony device 22A with telephony device 22B. The local number portability feature is provided by the server 26, and the signaling network 16 is configured to cooperate with the server 26 to resolve portability issues via the signaling gateway 28.

In operation, the switch 20 will recognize an incoming call from telephony device 22M and cooperate with the signaling network 16 to establish a connection with the called party, presumed to be at telephony device 22A. The switch 20 will provide the call processing "input" that is forwarded to the signaling gateway 28. As with most protocols, the signaling network 16 and switch 20 expect a response to the input, but may have little or no understanding of how that response is provided. Thus, the signaling gateway 28 will convert the call processing input to a corresponding message directed to the server 26.

Assuming a SIP environment, the input to initiate a call to telephony device 22A is a SIP INVITE request inviting telephony device 22A to engage the communication. The server 26 will process the INVITE request and determine that the party normally associated with telephony device 22A is now located at telephony device 22B. The corresponding SIP response is a MOVED command, indicating that the invited party is now at telephony device 22B. Thus, the response to the INVITE request received from the signaling gateway 28 is a MOVED response. The signaling gateway 28 will convert the MOVED response to a corresponding signaling network response that is expected by the signaling network 16 or switch 20 based on the original input. Based on the response, the switch 20 will recognize that the call should be connected to telephony device 22B, and a connection is made between telephony devices 22M and 22B.

As is clear from the example above, the signaling gateway 28 receives an input or message from the signaling network 16, which expects a response to the input. The signaling gateway 28 is required to convert the input into a corresponding message to send over the packet-switched network 14 using the appropriate protocol (SIP). Based on the signaling gateway's request, a response is received and converted to a proper response for the input. For the purposes of description, the act of responding to an input or making a request is referred to as a "transaction" carried out by the signaling gateway 28. Although the media flow setup shown in FIG. 1B is solely within the circuit-switched network 12, those skilled in the art will recognize that the connection may bridge the circuit-switched and packet-switched networks 12, 14 through the media gateway 18, or may remain solely within the packet-switched network 14.

Figure 2A:
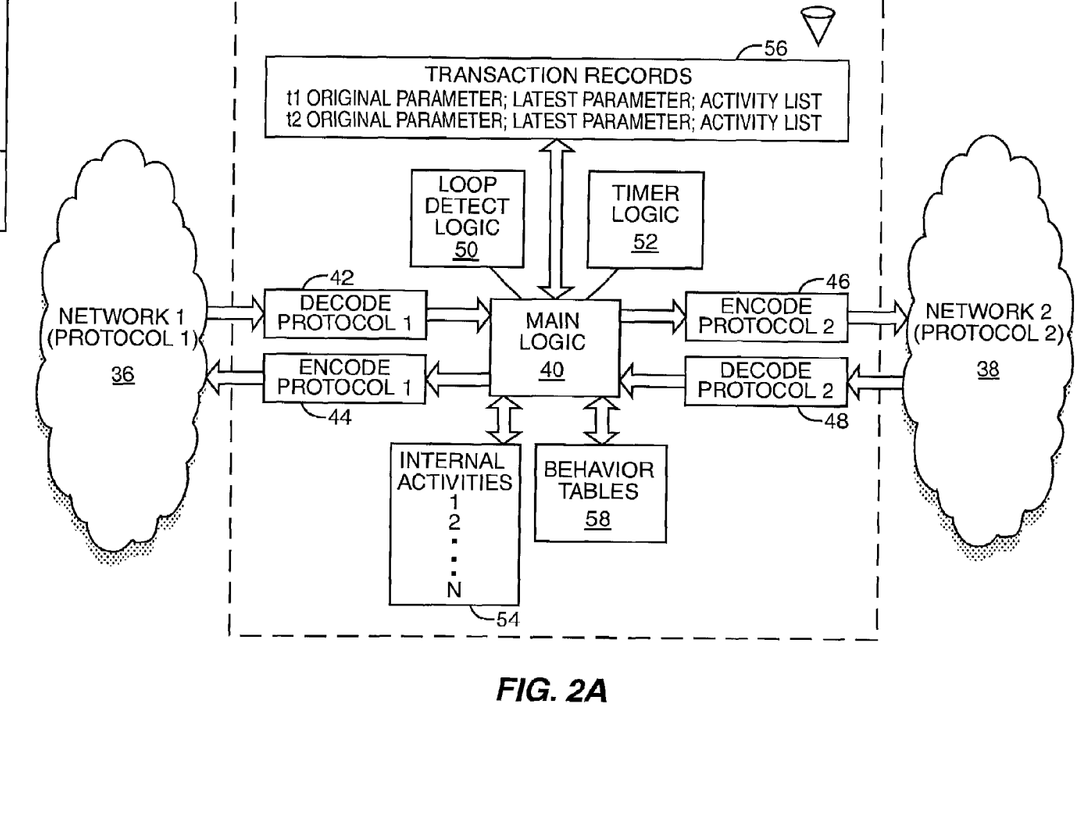
FIG. 2A is a block representation of a transaction manager according to a preferred embodiment of the present invention.

FIG. 2A depicts a logical representation of a transaction manager 34 capable of running in a gateway, such as the signaling gateway 28, to facilitate communications between first and second networks 36, 38. The transaction manager 34 will include a main logic unit 40 providing basic operation of the transaction manager 34 and sufficient logic to communicate with the first and second networks 36, 38. With respect to the first network 36, the main logic unit 40 is associated with decode logic 42 and encode logic 44, which are configured to decode messages from and encode messages to the first network 36, respectively, using a first protocol. Similarly, encode logic 46 and decode logic 48 are provided to encode messages to and decode messages from the second network 38, respectively, using a second protocol. In essence, the main logic 40, in association with the encode and decode logic 44, 46, 42, 48, is configured to translate messages traveling between the networks 36, 38 as well as to properly encode or decode messages traveling between the transaction manager 34 and one of the first and second networks 36, 38.

The transaction manager 34 also includes loop detect logic 50 and timer logic 52. The loop detect logic 50 is designed to detect perpetual logic loops, while the timer logic 52 is used to prevent undesirable delays in responding to a message from either of the networks 36, 38. Such delays are usually caused by a failed transaction. Both of these features will be discussed in greater detail below.

In essence, the transaction manager 34 is adapted to perform one or more activities based on an event. Each event may trigger additional activities, and certain activities may initiate additional events. The transaction manager 34 is preferably configured to carry out activities internally or to generate the proper message request to send to a device over one of the first and second networks 36, 38 capable of carrying out the activity. The activities capable of being handled by the transaction manager 34 are generally referred to as internal activities 54. Those activities initiated by the transaction manager 34, but provided by other network devices, are referred to as external activities.

Importantly, any given transaction, which is typically an incoming request requiring a response, may require any number of activities. In a SIP environment, an external activity may be any one of the numerous SIP requests, such as an INVITE request. The internal activities 54 may include any type of processing on the data or protocol conversion capable of being provided by the transaction manager 34.

In general, for any transaction, the main logic unit 40 creates and maintains transaction records 56 for the entirety of the transaction. As illustrated, the transaction records 56 may include an "original parameter," a "latest parameter" and an "activity list." The activity list for a transaction record is basically a sequence of activities, or functions, necessary for the given transaction. The activity list may include one or more activities, and the activities may be internal activities 54 or external activities. Further, carrying out certain activities may require additional activities, which are added to the activity list in the transaction record 56. As will be discussed in greater detail below, the dynamic functionality of the transaction manager 34 is facilitated by the ability to modify the activities in the activity list while fulfilling a transaction.

Preferably, the main logic 40 cooperates with behavior tables 58 to determine an initial activity list corresponding to a message to initiate a transaction coming from one of the first or second networks 36, 38. The behavior tables 58 will typically include initial activities to initiate defined transactions. Preferably, the behavior tables 58 are readily modifiable during operation to add, delete, or change activities for a transaction or add or delete acceptable transactions.

Figure 2B:
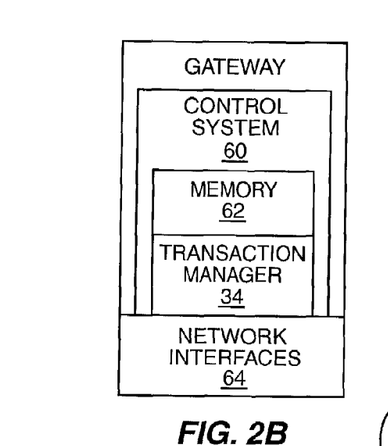
FIG. 2B is a block representation of a gateway constructed according to a preferred embodiment of the present invention.

A basic gateway architecture is shown in FIG. 2B. The gateway will preferably include a control system 60 and requisite memory 62 to facilitate the transaction manager 34. Further, the control system 60 is provided with one or more network interfaces 64 to facilitate physical interfaces with the first and second networks 36 and 38.

Figure 3A:
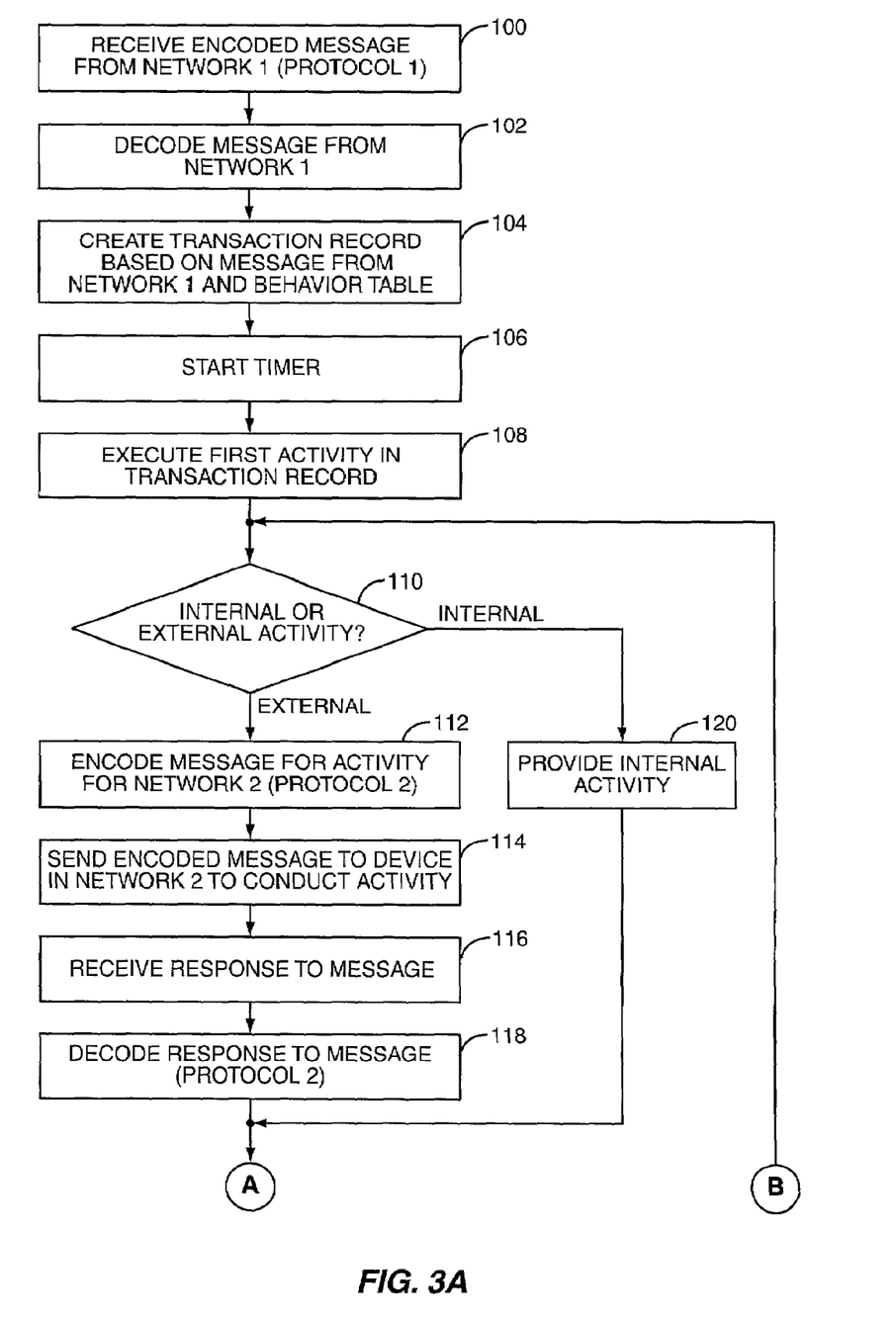
FIGS. 3A and 3B illustrate a flow chart outlining a basic process according to a preferred embodiment of the present invention.
Figure 3B:
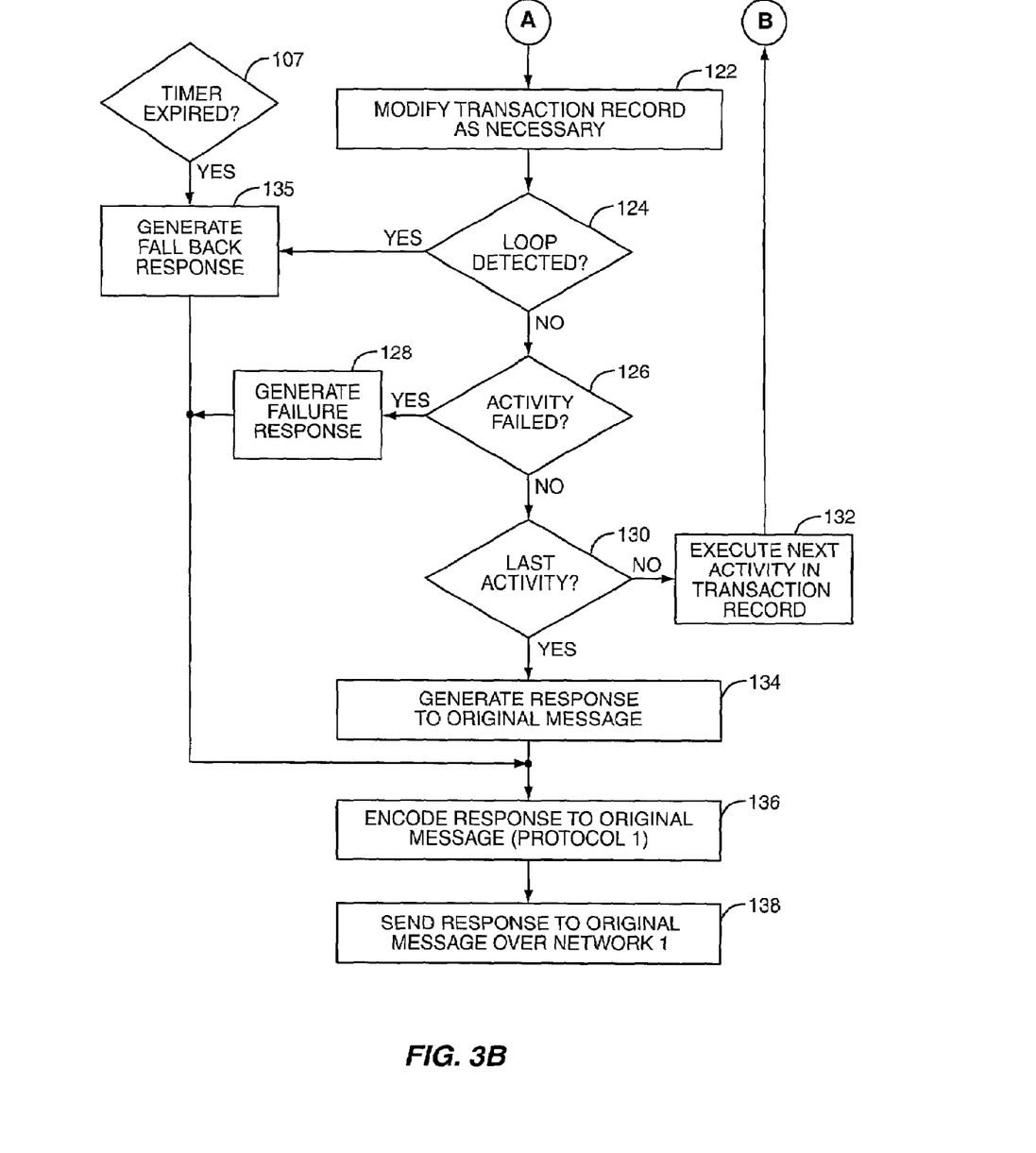

The basic flow of the transaction manager 34 is outlined in the flow chart provided in FIGS. 3A and 3B. The process typically begins when an encoded message is received from the first network 36 (block 100). The specific set of valid input messages and associated decode logic 42 can potentially be specified in the behavior table 58. The message is decoded by the decode logic 42 according to the first protocol (block 102). The main logic 40 will process the message and create a transaction record 56 including an activity list derived from the behavior table 58 (block 104). Assuming that the message relates to call processing, the original parameters may include the origination and destination telephone numbers. Preferably, the original parameters do not change throughout the transaction. Any parameter changes and updates are recorded in the latest parameter field. For the present example, assume the number for telephony device 22A has been ported to telephony device 22B from a call originating from telephony device 22M.

Figure 4:
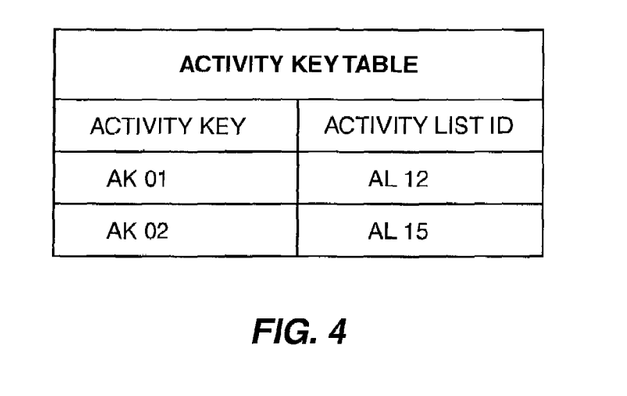
FIG. 4 is an exemplary activity key table according to an exemplary embodiment of the present invention.
Figure 5:
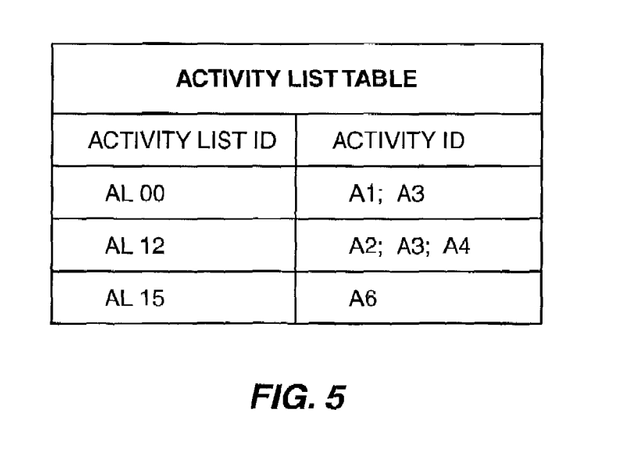
FIG. 5 is an activity list table according to an exemplary embodiment of the present invention.

Typically, the incoming message will include a signaling code for the transaction. The code may correspond to an activity key. As shown in FIG. 4, the transaction manager 34 may keep an activity key table, which correlates an activity key corresponding to the signaling code with an activity list identification (ID). The transaction manager 34 may also provide an activity list table associating the activity list ID with specific activities, designated with an activity ID, in a sequence in which to initiate the specific activities. The example in FIG. 5 depicts three activity list IDs: AL 00; AL 12; and AL 15. Activity list ID AL 00 corresponds to activities A1 and A3. Activity list ID AL 12 corresponds to activities A2, A3 and A4. Finally, activity list ID AL 15 is associated with activity A6. The activity key table and activity list table may be kept in the behavior tables 58 or elsewhere in the transaction manager 34. If the incoming message did not include a signaling code from which an activity key could be derived, the transaction manager 34 may be programmed to use a default activity list ID, such as AL 00, to create an activity list having activities A1 and A3. For example, if the message corresponded to the activity key AK 01 in FIG. 4, the corresponding activity list ID is AL 12, which corresponds to the activities A2, A3, and A4 as shown in FIG. 5.

Returning now to the flow chart of FIGS. 3A and 3B, the transaction manager 34 will start a timer using the timer logic 52 (block 106) and execute the first activity in the activity list of the corresponding transaction record 56 (block 108). Assuming the activity list includes activities A2, A3 and A4, activity A2 is executed. To determine how to execute the activity, the transaction manager 34 may consult an activity definition table, such as that shown in FIG. 6, for activity A2.

The activity definition table may include several fields. The fields may include, but are not limited to: ACTIVITY TYPE, INVOCATION MESSAGE, RESPONSE MESSAGE, SUCCESS RESPONSE, FAILURE RESPONSE, FALL BACK RESPONSE, and SERVERs capable of fulfilling the activity. For the example shown in FIG. 6, activity ID A2 is an external activity, as defined by the ACTIVITY TYPE, which is configured to trigger a SIP INVITE as the INVOCATION MESSAGE. As such, the transaction manager 34 will invoke the encode logic 46 to initiate a SIP INVITE to one of SERVERs 1-4. By definition, in response to the INVOCATION MESSAGE, activity A2 expects a SIP MOVED as a RESPONSE MESSAGE. Further, upon receipt of the RESPONSE MESSAGE from the second network 38, the transaction manager 34 is configured to provide a CONNECT (TCAP) response over the first network 36 in response to the message originating from the first network 36.

Figure 6:
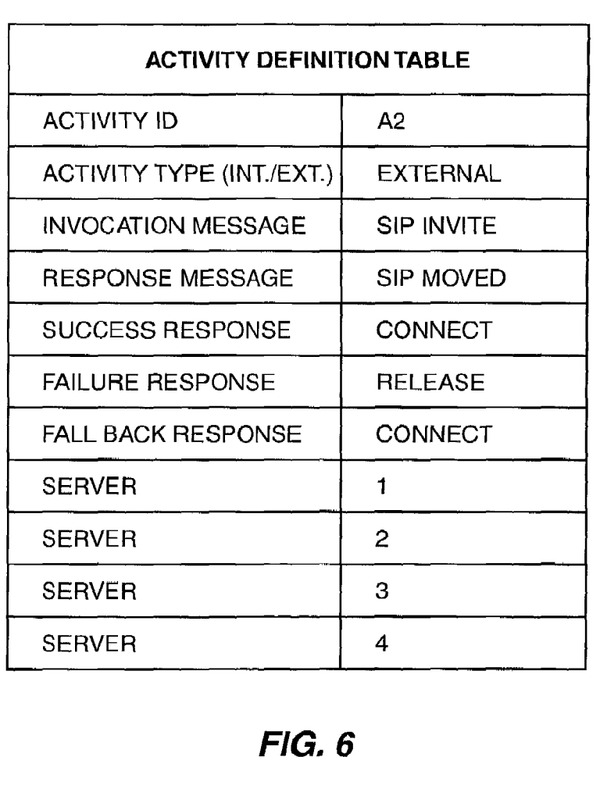
FIG. 6 is a table illustrating an activity definition according to an exemplary embodiment of the present invention.

The A2 activity also provides for a FAILURE RESPONSE in case a response to the INVOCATION MESSAGE is not provided. The FAILURE RESPONSE could be a line release (RELEASE) instruction. Additionally, a FALL BACK RESPONSE may include a CONNECT instruction to connect with the originally requested terminal. Those skilled in the art will recognize various options for configuring activities.

If at any time during transaction processing the timer expires (block 107 in FIG. 3B), the transaction manager 34 ceases normal transaction processing, generates the fall back response (block 135) and properly terminates the transaction by encoding the fall back response to the original message (block 136) and sending the response to the original message (block 138). Everything related to any activities of the transaction, including any responses later received by the transaction manager after the timer expires, is ignored.

Returning FIG. 3A, the transaction manager 34 will preferably determine whether the activity is an internal or external activity (block 110). For an external activity, a message associated with the activity is encoded for delivery over the second network 38 using the second protocol (block 112). The encoded message is sent to the defined device in the second network to fulfill the activity (block 114). The transaction manager 34 will await a response to the message (block 116) and decode the response using the second protocol (block 118). If the activity is an internal activity (block 110), the transaction manager 34 will provide the internal activity (block 120).

After carrying out the internal or external activity, the transaction manager 34 will modify the transaction record 56 as necessary (block 122). As noted, the modification may include adding additional activities, changing existing activities, or removing activities from the activity list.

Figure 7:
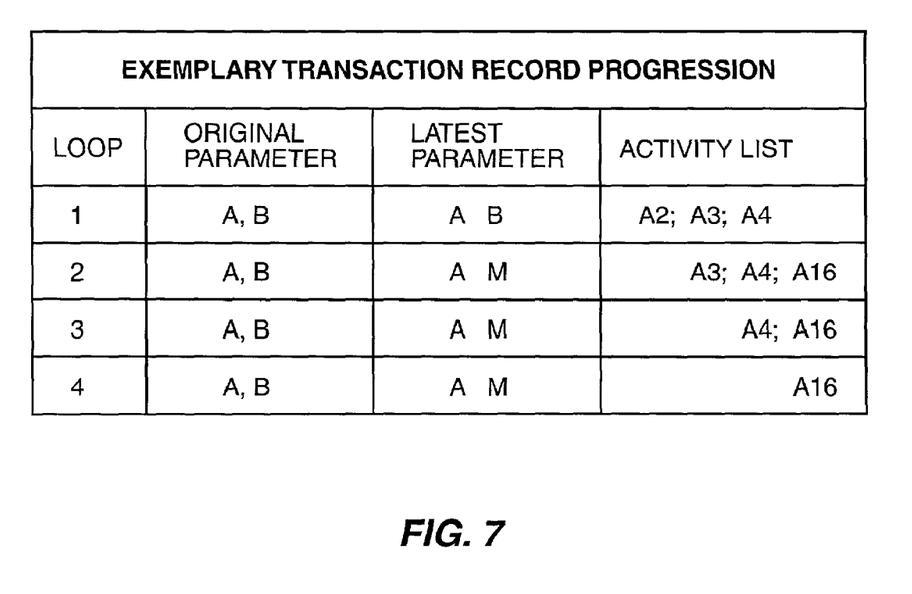
FIG. 7 illustrates an exemplary progression of a transaction record according to an exemplary embodiment of the present invention.

An example progression of an exemplary transaction record is illustrated in the table of FIG. 7. The table represents four loops through the process flow of FIGS. 3A and 3B. Initially, the transaction manager 34 may derive the initial activity list (A2, A3, and A4) from the behavior tables 58 based on the transaction requested. As such, the transaction manager 34 will initiate implementation of activity A2. Assume activity A2 provides for modifying the original parameter and requires the addition of another activity (A16) to the activity list. As such, the "LATEST PARAMETER" field is modified to represent the change in parameters while the "ORIGINAL PARAMETER" field preferably remains the same with the original parameters. The transaction manager 34 will progress through the activity list one activity at a time until all of the activities are completed. In the example, the progression of activities will include A3, A4, and A16 after completing A2.

The transaction manager 34 will next determine if a loop has been detected (block 124). If a loop is detected, the activity processing stops, a fall back response is generated (block 135), and the transaction manager 34 proceeds to encode and deliver the response (block 136).

The transaction manager 34 will next determine whether or not the activity has failed (block 126). If the activity has failed, the activity processing stops, a failure response is generated (block 128), and the transaction manager 34 proceeds to encode and deliver the response (block 136).

If the timer has not expired, a loop has not been detected, and the activity has not failed, the transaction manager 34 will evaluate the activity list to determine if all of the activities have been processed (block 130). If activities remain in the activity list, the transaction manager 34 will execute the next activity in the activity list of the transaction record 56 and continue with activity processing.

If the last activity has been executed (block 130) the transaction manager 34 will generate a response to the original message initiating the transaction based on the results of the final activity and the data in the transaction record (block 134). The response is encoded using the first protocol (block 136), and sent over the first network as a response to the original message (138).

Those skilled in the art will appreciate the flexibility imparted to a gateway implementing the transaction manager of the present invention. The present invention enables a data-driven, dynamic transaction manager capable of coordinating interworking between disparate networks. The transaction manager may dynamically determine which tasks, messages, and interactions must be involved in the fulfillment of a transaction based on a variety of data-driven sources. A flexible, general-purpose transaction manager is provided, rather than a rigid architecture requiring application-specific configuration. With the present invention, the data driving the transaction manager may involve parameters from the incoming inquiry message, parameters in data from various sources associated with the contents of the incoming message, and parameters in the gateway's behavioral configuration data, as well as parameters received in response from activities involved directly in the transaction.

The dynamic behavior of the transaction manager allows individual instances of inbound messages in one protocol encoded in a single format to initiate a variety of activities in the network being interfaced without any direct knowledge of what is required in that network. The present invention also allows the selection of activities to be dependent on data arising from an inquiry in the second network, rather than on logic hard coded in the gateway. The transaction manager is capable of transparently involving multiple application servers in a load sharing fashion for any type of transaction. The network issuing the inquiry need not know the existence or details of these servers, or which ones are involved in a given transaction.

Additionally, the behavior of the gateway implementing the transaction manager is easily customized to support different interworking applications by simply supplying behavioral configuration data to select a set of desired activities and messages, rather than building dedicated gateways or gateway applications for specific interworking tasks. In essence, software functions are dynamically selected for reuse as the transaction manager executes transactions. Network operators have the ability to change behavior in live networks by simply updating behavioral data, activity lists, or activities, without requiring a reload or restart of the system.

Many aspects of the invention may be implemented by program code. The program code together with the hardware described above may provide means to provide the transaction manager and functionality thereof. The program code may be stored on any type of computer readable medium or any type of computer or control system, such as those commonly found in gateways. For further information relating to messaging between disparate networks, attention is directed to U.S. application Ser. No. 09/638,580, filed Aug. 15, 2000, entitled "Method and Apparatus for Messaging Between Disparate Networks," which claims the benefit of provisional application Ser. No, 60/186,389, filed Feb. 18, 2000. The disclosures of these applications are incorporated herein by reference.

Those skilled in the art will recognize numerous modifications and additional benefits provided by the present invention. Notably, a single transaction may require more than one set of query/response messages. For example, the first network may send an inquiry that causes a message to be sent to the second network. Receipt of the message at the second network causes an inquiry for more information from the first network. The first network may respond with the requested additional information. As a result, the second network can formulate a response to the original inquiry and send it to the first network. Multiple intermediate query-response messages may be needed before the original inquiry can be answered. These additional benefits could also include, but are not limited to use of dynamic transaction manager concepts concurrently between numerous networks, some possibly involving similar protocols. All such modifications are considered within the scope of the above disclosure and the claims that follow.

Further, the dynamic transaction manager technology may be used in situations where activities are desired on messages passing trough a gateway that may be connecting networks of the same or different architectures such as screening of message content for security. In this case, transactions may be dynamically managed even though the networks may not be disparate but just under the control of disparate operators.

What is claimed is:

1. A method for dynamically managing interactions between separate data communication networks comprising:
   a) receiving a first request requiring a first response via a first network;
   b) building a record including one or more activities necessary to provide the first response for the first request;
   c) facilitating execution of the one or more activities in the record until no activity requires execution, wherein the execution of at least one of the one or more activities takes place in a second network;
   d) modifying the record in response to executing the at least one of the one or more activities that takes place in the second network by adding an activity that requires execution to the record; and
   e) generating the first response based on execution of the one or more activities.

2. The method of claim 1 further comprising building the record to have an activity list including the one or more activities.

3. The method of claim 2 wherein the modifying step further comprises modifying at least another one of the one or more activities in the activity list in response to executing any of the one or more activities besides the at least one of the one or more activities that takes place in the second network.

4. The method of claim 3 wherein the modifying step further comprises modifying the record by at least one of the group consisting of:
   a) adding at least one activity to the activity list in response to executing any of the one or more activities;
   b) removing at least one activity from the activity list in response to executing any of the one or more activities; and
   c) changing at least one activity within the activity list in response to executing any of the one or more activities.

5. The method of claim 2 further comprising updating the one or more activities in the activity list in response to executing any of the one or more activities to provide an updated activity list and facilitating execution of the one or more activities in the order listed in the updated activity list.

6. The method of claim 2 further comprising initially determining the one or more activities from behavioral data corresponding to the first request.

7. The method of claim 6 further comprising modifying the behavioral data corresponding the first request by an operator during operation.

8. The method of claim 1 further comprising building the record to have a parameter field and modifying the record by modifying at least one parameter in the parameter field in response to executing any of the one or more activities.

9. The method of claim 1 wherein execution of the at least one of the one or more activities that takes place in the second network further comprises:
   a) generating a second request directed to the device;
   b) sending the second request to the device over the second network; and
   c) receiving a second response to the second request from the device over the second network, the second response representing the results of execution of the external activity.

10. The method of claim 9 wherein at least one of the one or more activities is an internal activity and further comprising executing the internal activity.

11. The method of claim 9 wherein the second request and the second response use a second protocol.

12. The method of claim 1 further comprising generating the first response when one of the one or more activities fails to execute.

13. The method of claim 1 further comprising generating the first response when one of the one or more activities fails to execute within a select period of time.

14. The method of claim 1 further comprising generating the first response when the method falls into executing a perpetual, logical loop.

15. A gateway implementing manager comprising an interface to a first data communication network supporting a first protocol; an interface to a second data communication network supporting a second protocol; and a control system adapted to process interaction initiated by a message received from the first network by:
   a) selecting an initial process for the interaction including a sequence of functions to implement;
   b) for any internally executable functions of the sequence of functions, executing the function internally, and for any externally executable function of the sequence of functions:
      i) generating a request directed to a device in the second network;
      ii) sending the request to the device over the second network; and
      iii) receiving a response to the request from the device over the second network, wherein execution of each function provides data relating to the interaction;
   c) modifying the initial process for the interaction based on the data relating to the interaction; and
   d) providing a different response to the message over the first network after processing the interaction.

* * * * *